MONOPHONIC-STEREOPHONIC AUTOMATIC SWITCHING AND DEMODULATOR CIRCUIT
Filed May 18, 1964
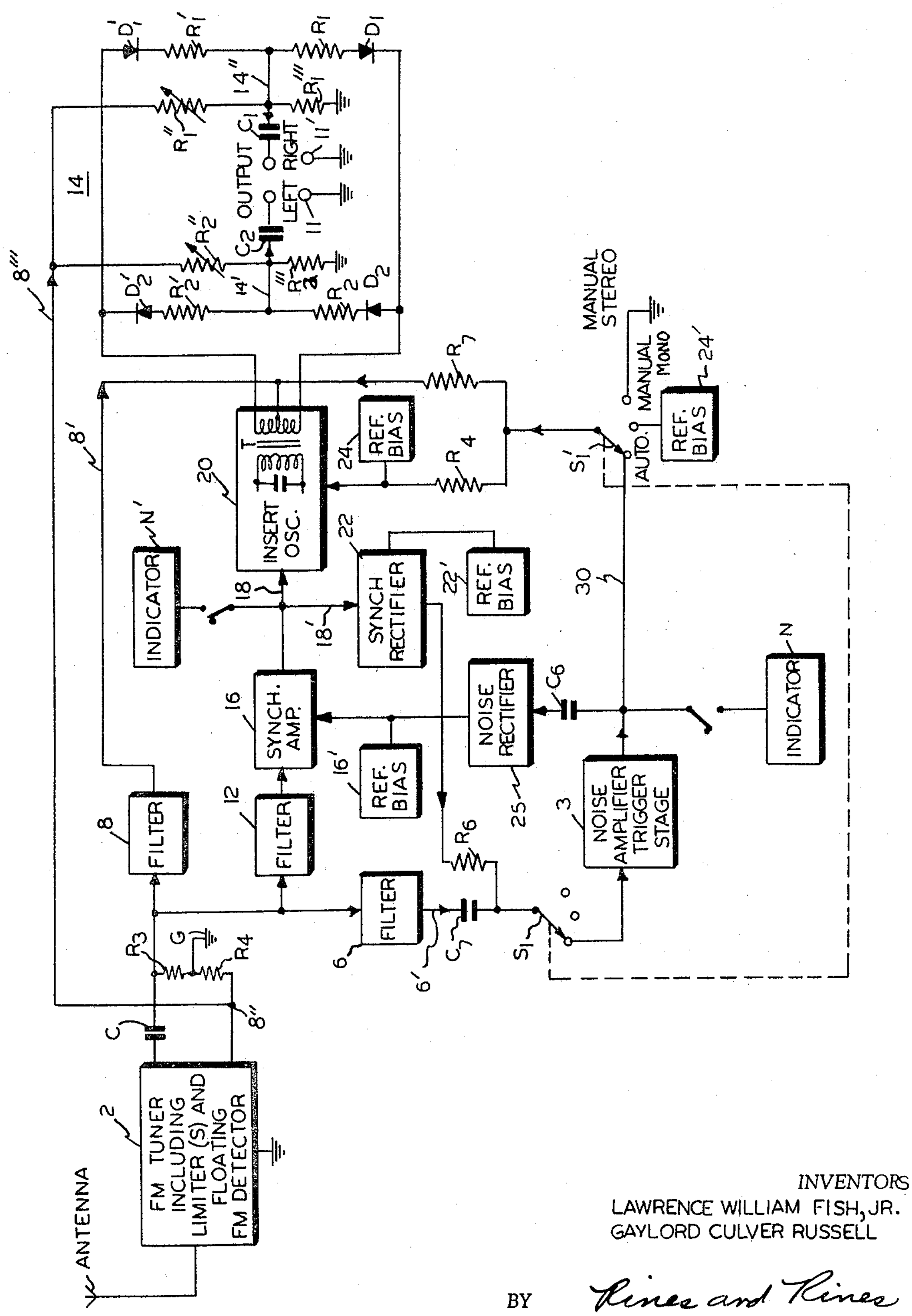
INVENTORS
LAWRENCE WILLIAM FISH, JR.
GAYLORD CULVER RUSSELL
BY Rines and Rines
ATTORNEYS 3,296,378

MONOPHONIC - STEREOPHONIC AUTOMATIC SWITCHING AND DEMODULATOR CIRCUIT

Lawrence William Fish, Jr., Fitchburg, and Gaylord Culver Russell, Saxonville, Mass., assignors to H. H. Scott, Inc., Maynard, Mass., a corporation of Massachusetts Filed May 18, 1964, Ser. No. 368,033
6 Claims. (Cl. 179—15)

The present invention relates to monophonic-stereophonic switching circuits and more particularly to improved circuits for automatically enabling two common pairs of output terminals to be connected to left and right stereo output pairs of a received stereophonic radio broadcast transmission and alternately to a common monophonic output pair of a monophonic radio broadcast transmission during the tuning of an FM receiver to such broadcasting system.

The previous circuits evolved for performing the above function have been sucessfully employed; but they have been subject to several disadvantages. While a stereophonic FM receiving system can be operated with the stereophonic demodulating circuit connected at all times to receive stereo broadcast transmissions, the reception in the case of weak stations transmitting monophonic signals is unnecessarily noisy. In addition, beat frequency whistles often occur when the monophonic broadcasting station is also broadcasting background music in the stereo subcarrier range. The art, therefore, has preferred to provide an automatic means for switching between monophonic and stereophonic reception in the tuner apparatus. Relays have been employed for this purpose but they are subject to several disadvantages including their expense, the sharp electrical transients created by contact closing; the mechanical noises involved in the opening and closing of the contacts, and the relatively long time constant of action of the relays which will not permit functioning of the same if tuning is changed rapidly. Resort has principally been had, therefore, to two pairs of diodes that alternately conduct in oposite directions to switch to two common pairs of output terminals (either the single monophonic output pair or the two stereo output pairs) under the control of either a relay, subject to the above-described disadvantages, or under the control of a linear direct-current amplifier. It is recognized that all these output pairs may operate in an unbalanced connection whereby one of each output pair is grounded, thereby obviating the switching connection for the grounded leads. One of the disadvantages in the use of conventional direct-current amplifiers, however, resides in the fact that its input signal may be such that the output of the amplifier does not provide complete bias voltage in one direction or the other for the switching of the diodes. This causes distortion because the signal level in either voltage or current may exceed the reverse voltage provided by the switching circuit to the opposite pair of diodes.

In copending application of Daniel R. von Recklinghausen, Serial No. 376,035, filed June 18, 1964, and entitled "Monophonic-Stereophonic Automatic Switching Circuit," a novel improved circuit of the above-described character is disclosed that obviates the necessity for relays and that overcomes the disadvantages of prior-art, direct-current amplifier control of such switching diodes by the utilization of a trigger circuit that exerts a positive control on the biasing of the switching diodes without any possibility of any in-between or insufficient bias voltage and bias current being applied thereto that introduces the above-mentioned distortion. It is an object of the present invention to provide a new and improved circuit of this type in which separate switching diodes are not required; but, to the contrary, common use is made of the stereophonic signal demodulator diodes to provide the said switching function, as well.

A further object of the invention is to provide a novel monophonic - stereophonic automatic searching and switching system.

An additional object is to provide a novel switching irccuit of the above-described character that is also of more general utility than in the specific illustration of switching between monophonic and stereophonic outputs though, for purposes of illustration, it will be described as applied to this preferred application.

Other and further objects will be explained hereinafter and will be more particularly pointed out in connection with the appended claims.

The invention will now be described in connection with the acompanying drawing, the single figure of which is a combined block and schematic circuit diagram illustrating the invention in preferred form.

Referring to the drawings, a conventional FM tuner including one or more limiters and a floating FM detector is shown at 2, receiving signals from an antenna or other source, and applying the output of the FM detector to a plurality of filters 6, 8 and 12 that are respectively tuned to filter out noise above all broadcast modulation frequencies (as with the aid of a 75 kc. high-pass filter 6), composite stereophonic program signals (as wtih the aid of a 50 c.p.s. to 53 kc. filter 8), and a pilot tone filter 12 for the stereophonic 19-kilocycle synchronization pilot signal. The stereophonic broadcast signals will be of the type described, for example, in an article by the said Daniel R. von Recklinghausen entitled "Stereophonic FM Receivers and Adaptors" appearing in the Institute of Radio Engineers Transactions on Broadcast and Television Receivers, BTR7, No. 3, November 1961, involving the modulation of a monophonic signal being the sum of the left and right channel signals, a 38-kilocycle double side-band suppressed-carrier amplitude-modulation signal serving as a subcarrier and in turn being modulated by the difference between the left and right channel signals, and the before-mentioned 19-kilocycle synchronizing pilot signal. The output of the noise filter 6 is shown connected by a conductor 6', through a coupling capacitor $C_7$ and a switch $S_1$ to the input of a trigger circuit 3, such as a normally conducting amplifier stage. In the case of a proper signal transmission from a broadcast station, the output of the filter 6 will be zero, so that no input is applied to alter the operation of the normally conducting state of the stage 3.

In the event that monophonic transmissions are received in the tuner 2, there will be an output of the filter 8 that is applied at 8' to a stereophanic demodulator 14 of a suppressed-carrier series switching type later described in detail. As hereinafter explained, there will be a monophonic output in both the left and right stereo outputs shown at 14' and 14'' of the stereophonic demodulator 14, respectively applied through coupling capacitors $C_2$ and $C_1$ to the respective pairs of left and right output terminals 11 and 11'.

In the operation of the demodulator 14 in response to stereophonic reception, however, a composite signal is fed through the filter 8 at 8' to the transformer T that is coupled to the tuned circuit of a 38-kilocycle re-insert oscillator 20 employed with the demodulator 14. With the oscillator 20 operating, diodes $D_2$ and $D_2'$ of the demodulator 14 and, alternately the oppositely poled diodes $D_1$ and $D_1'$, will conduct through respective resistors $R_2$, $R_2'$, $R_1$ and $R_1'$ and thereby demodulate the stereophonic signal in accordance with the principles discussed in the said article, providing left and right outputs at the pairs of output terminals 11 and 11′ through the coupling capacitors $C_2$ and $C_1$, respectively. Proper separation of the signal is effected by having an opposite-poled connection at 8″ to provide an opposite-poled composite signal along conductor 8‴ that is applied through resistors $R_2''$ and $R_1''$ to the respective coupling capacitors $C_2$ and $C_1$, with the points of connection to those capacitors being returned through resistors $R_2'''$ and $R_1'''$ to ground. The oppositely-poled composite signal is developed from the floating detector of the tuner 2 and resistors $R_3$ and $R_4$, the junction of which is grounded at G. The coupling capacitor C prevents dirdect-current output resulting from misalignment or mis-tuning from the detector of the tuner 2 reaching conductors 8′ and 8‴. In stereophonic operation, the voltage resulting along conductor 30 in the output of the trigger stage 3 is at ground potential so that, through switch $S_1'$ (in the "AUTOMATIC" position shown) and resistor $R_4$, and in conjunction with appropriate bias 24, the oscillator 20 is enabled to oscillate in normal fashion to effect re-insert sub-carrier generation as described above. No D.C. bias voltage is applied to any of the demodulator diodes $D_1$, $D_2$, $D_1'$ or $D_2'$ by way of resistance $R_7$. The same function would occur with the switch $S_1'$ in the manual "STEREO" position, ganged switch $S_1$ being then open-circuited.

There will be no output from the 19-kilocycle pilot tone filter 12 in the case of the monophonic transmissions, so that no output is produced by a synchronizing amplifier 16 connected to the filter 12. The synchronizing output of 16 is shown connected by conductor 18 to the 38-kilocycle re-insert oscillator 20 associated with the stereophonic demodulator 14, as described in the said article. It is also shown connected by conductor 18′ to a synchronization rectifier 22 which, in the case of no output from the filter 12, applies no modifying bias voltage to the trigger stage 3 by way of resistance $R_6$, so that stage 3 remains in its conductive state as before explained. The voltage resulting at 30 will apply cut-off bias through $R_4$ to cut off the re-insert oscillator 20 and simultaneously apply a D.C. voltage through $R_7$ to conductor 8′ to bias the diodes in the stereophonic demodulator 14, so that diodes $D_1$ and $D_2'$ are biased to be fully conductive, or effective, in their forward mode and diodes $D_1'$ and $D_2$ are non-conductive or ineffective in their reverse-biased mode. The diodes would operate in reverse fashion for opposite polarity voltage on conductor 30. The monophonic signal, therefore, will pass along conductor 8′, diode $D_2'$, resistor $R_2'$, conductor 14′ and capacitor $C_2$ to the left output terminals 11, and along conductor 8′, diode $D_1$, resistor $R_1$, conductor 14″ and capacitor $C_1$ to the right output terminals 11′. A monophonic signal of opposite polarity, but reduced in value through adjustable resistors $R_2''$ and $R_1''$ will also be applied to conductors 14′ and 14″, respectively, insuring that minor change in audible volume occurs as the demodulator circuit 14 is shifted from monophonic to stereophonic operation by any change in control voltage at conductor 30, as later described. Identical operation results if switch $S_1'$ is moved to the manual "MONOPHONIC" position, in which a reference bias is applied from 24′ to cut off the re-insert oscillator 20 through resistor $R_4$ and modify the operation of the demodulator 14, as before explained, by way of resistor $R_7$ to render the demodulator ineffective to demodulate stereophonic signals.

Thus, when a monophonic transmission occurs, the monophonic signal is applied to both the left and right output terminals pairs 11 and 11′ of the apparatus and, in effect, the stereophonic portion of the circuit is rendered ineffectual.

When the station is transmitting a stereophonic program signal, however, this is identified by an output of the pilot tone filter 12 (19 kilocycles) which activates the synchronizing amplifier 16 and thus synchronizes the action of the 38-kilocycle insert oscillator 20, further applying an output voltage along conductor 18′ to the synchronizing rectifier 22, producing a direct-current output relative to a reference bias 22′ that modifies the bias upon trigger stage 3 by way of resistor $R_6$. This modification changes the voltage to approximately ground at 30 and removes D.C. bias from all four diodes of the demodulator 14, removing cut-off bias from the oscillator 20. The stereophonic signal is thus demodulated at 14, as before described, producing left and right outputs at conductors 14′ and 14″ that are applied respectively through coupling capacitors $C_2$ and $C_1$ as the separate left and right stereo outputs at respective output terminal pairs 11 and 11′.

In view of the on or off switching action of the stage 3, the diodes $D_1$, $D_2$, $D_1'$, $D_2'$ always receive either the correct positive or the correct negative full bias voltages for monophonic operation or are positively switched by the oscillations of the re-insert oscillator 20 to effect stereophonic demodulation.

The same diode detecting devices that are employed in the demodulator 14 for stereophonic-signal demodulation are thus conveniently and economically employed, also, for switching monophonic or stereophonic signals to the output terminals 11, 11′, either by manual control or automatically, depending upon the setting of switch $S_1'$.

A neon or other appropriately biased indicator device N may be connected to indicate that there has been automatic switching to the stereophonic program as a result of the voltage change at conductor 30. Alternately, an indicator N′ might be directly operated by the output of the synchronizing amplifier 16 which becomes energized upon the reception of the stereophonic program signal, or by the presence of oscillations of the oscillator 20. Since the stage 3 is normally conducting, it may also be used as a substantially linear amplifier for amplification of inter-station noise in order to cause the diode switching circuit at 14 to keep the system in the monophonic connection during off-station tuning or when tuned to a very weak stereophonic station, where the poor signal-to-noise ratio would make listening enjoyment impossible. Thus, the output of the stage 3 may be coupled through capacitor $C_6$ to a noise rectifier 25 the direct-current output of which may serve to cut off the synchronizing amplifier 16 in conjunction with a reference bias source 16′, thus cutting off any output at 18′ that is fed to the synchronizing rectifier 22, and thereby maintaining the trigger circuit 3 in the monophonic mode. No program material, but only noise above all broadcast modulation frequencies resulting in the output of the filter 6 will be applied at 6′ through capacitor $C_7$ to the stage 3, so that, upon the process previously described, the stage 3 will be normally maintained in the monophonic conducting mode. Upon tuning to a station having a sufficient signal-to-noise ratio the output of the filter 6 will be accordingly reduced.

In order to prevent the system from switching over to the stereo mode if there is insufficient synchronizing signal, the reference bias 22 is adjusted such that the output of the synchronizing amplifier 16 will be larger than is required for minimum synchronization of the 38-kilocycle insert oscillator 20. Therefore, loss of synchronization is automatically indicated by the switching of the trigger circuit 3 to the monophonic mode position.

The switching diodes may also take the form of other types of switching devices of this character, the terms "diode" or "detecting" device being used generically to embrace elements that can conduct substantially more in one direction but substantially less in the other upon appropriate bias conditions. Further modifications will also occur to those skilled in the art and all such are considered to fall in the spirit and scope of the invention as defined in the appended claims.

What is claimed is:

1. Apparatus for switching a common pair of output terminals to monophonic and stereophonic signal outputs, that comprises, a trigger circuit biased normally to operate in one of two states of conduction, monophonic and stereophonic signal-receiving means, a stereophonic-signal demodulator circuit comprising a plurality of detecting means biased so that one of the said detecting means is normally effective, means for connecting the monophonic and stereophonic signal-receiving means to the demodulator circuit, means operative in the presence of a monophonic signal for maintaining the trigger circuit in its said one state to apply the monophonic signal output through the said one detecting means to the said output terminals and to render the demodulator circuit ineffective to demodulate stereophonic signals, means responsive to the output of the stereophonic signal-receiving means for modifying the bias of the said trigger circuit to cause the same to assume its other state, means controlled by the assumption of the said other state by the trigger circuit for changing the detecting means bias to render the said one detecting means ineffective and other of the detecting means effective while rendering the stereophonic demodulator circuit effective and applying the stereophonic pair of received signals through the said other detecting means to the pair of said output terminals, the said responsive means including means controlled by a received pilot signal accompanying the stereophonic signals for producing a direct-current bias-modifying signal for application to the said trigger circuit, and means responsive to a noise signal indicative of inadequate stereophonic signal for eliminating the said direct-current bias-modifying signal, thereby returning the trigger circuit to its said one state of conduction.

2. Apparatus as claimed in claim 1 and in which demodulator circuit is provided with an insert oscillator which is rendered effective and ineffective in response to the state of the said trigger circuit.

3. Apparatus as claimed in claim 1 and in which manual-controlled switch means is provided for rendering the demodulator circuit effective and ineffective as a stereophonic signal demodulator while substantially simultaneously effecting the said changing of the bias of the detecting means selectively to apply therethrough monophonic and stereophonic signals to the said output terminals.

4. Apparatus for selectively switching a common pair of output terminals to two different types of signals; that comprises, frequency-modulation signal-receiving means for receiving the two different types of signals, a demodulator circuit comprising a plurality of detecting means for detecting one of the said types of signals, means responsive to the reception of the other type of signals in the receiving means for applying the same through one of the detecting means to the output terminals while substantially simultaneously rendering the demodulator circuit ineffective to demodulate the said one type of signals, means responsive to the reception of the said one type of signals in the receiving means for rendering the said one detecting means ineffective while rendering the demodulator circuit effective to demodulate the said one type of received signals and to apply the same through other of the said detecting means to the said output terminals, the apparatus further having amplifier means, the states of conduction of which produce different bias conditions for rendering the demodulator circuit effective and ineffective, means controlled by a received pilot signal accompanying the said one type of signal for producing a bias-modifying signal for changing the state of conduction of the said amplifier means, and means responsive to a noise signal indicative of inadequate reception of the said one type of signal for controlling the state of conduction of the said amplifier means to prevent application of such inadequate signal to the said output terminals.

5. Apparatus as claimed in claim 4 and in which switch means is provided for applying different bias voltages to the demodulator circuit to render the same effective and ineffective.

6. Apparatus as claimed in claim 4 and in which the said one and other types of signals are stereophonic and monophonic signals, respectively.

References Cited by the Examiner

UNITED STATES PATENTS

| | | | |
|---|---|---|---|
| 3,070,662 | 12/1962 | Eilers | 179—15 |
| 3,167,615 | 1/1965 | Wilhelm et al. | 179—15 |
| 3,242,264 | 3/1966 | DeVries | 179—15 |

DAVID G. REDINBAUGH, *Primary Examiner.*

ROBERT L. GRIFFIN, *Examiner.*